Patented June 14, 1949

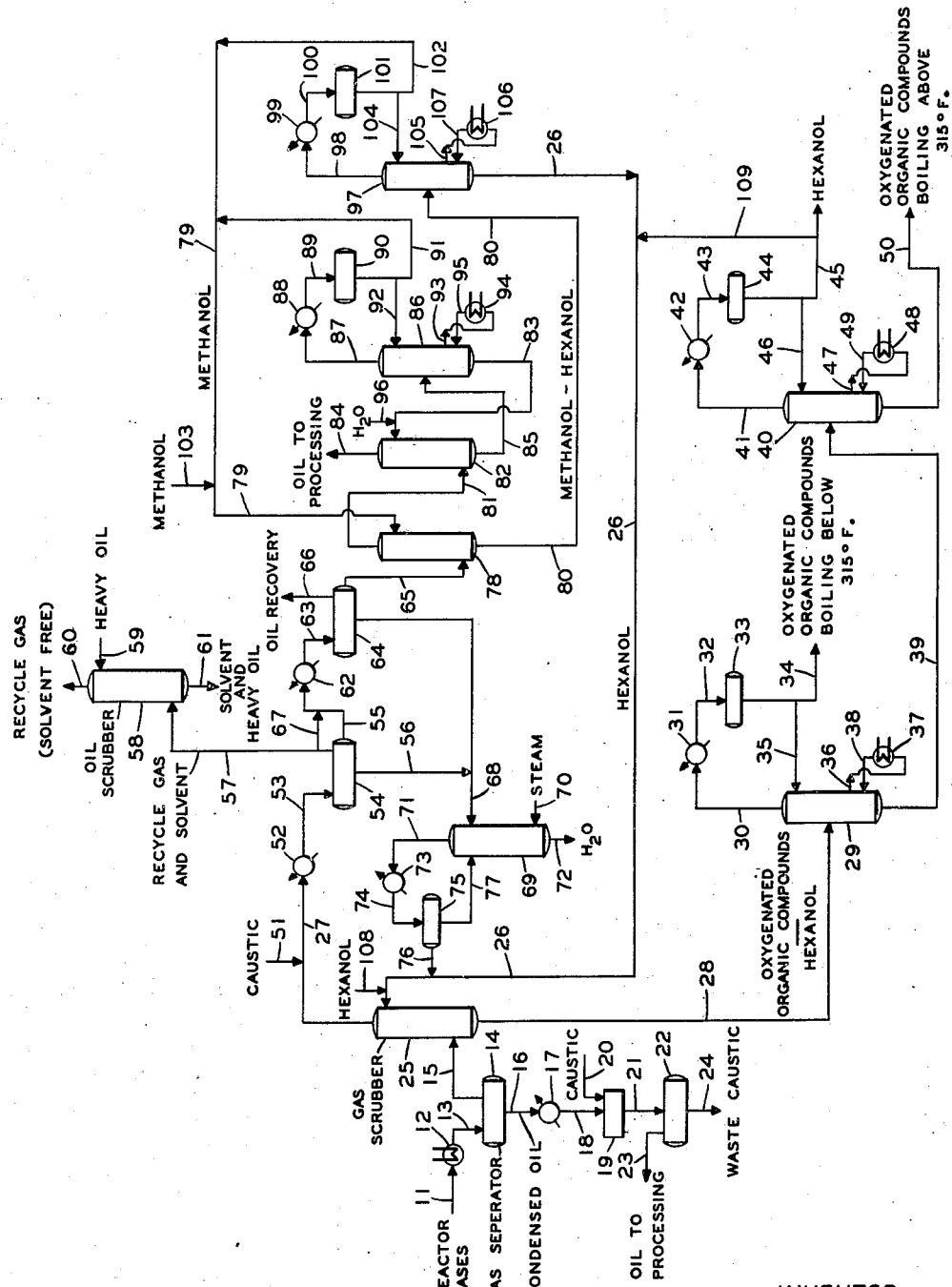

2,472,837

UNITED STATES PATENT OFFICE 2,472,837

SEPARATION OF ORGANIC COMPOUNDS

Charles C. King, Roselle, N. J., assignor to The M. W. Kellogg Company, Jersey City, N. J., a corporation of Delaware Application February 27, 1947, Serial No. 731,267

16 Claims. (Cl. 260—450)

This invention relates to the separation of organic compounds, and relates more particularly to the separation of organic compounds from the reaction product obtained in the reduction of oxides of carbon with hydrogen, in the presence of a catalyst at elevated temperatures. Still more particularly, the invention relates to the separation of oxygenated organic compounds from hydrocarbons present in the reactor gas obtained in the hydrogenation of oxides of carbon, in the presence of a reducible metal catalyst at an elevated temperature. These compounds may include light and heavy alcohols, organic acids, esters, aldehydes, ketones and hydrocarbons.

The separation of oxygenated organic compounds and hydrocarbons obtained in the catalytic hydrogenation of oxides of carbon at elevated temperatures, normally entails recovering the aforementioned compounds in successive steps whereby oxygenated organic compounds are finally separated from hydrocarbons, followed by the recovery of different classes of oxygenated organic compounds, either individually or in mixtures thereof. Such procedure also necessitates employing large overall heat-loads, resulting in large operating costs to satisfy relatively high heat requirements at different points in the recovery plant. Further disadvantages are encountered, in that large quantities of organic chemicals are of necessity, recycled to the various reaction systems before substantial recovery is effected; in addition, substantial separation of oxygenated organic compounds from hydrocarbons is not ordinarily achieved by the use of such procedure, and results in the carry-over of these compounds with hydrocarbons into oil recovery units, making subsequent separation difficult and uneconomical.

It is an object of this invention to provide for an improved method for the separation of substantially all oxygenated organic compounds and hydrocarbons, present in the reaction product obtained in the catalytic hydrogenation of oxides of carbon at elevated temperatures. Another object of this invention is to provide an improved method for effecting separation of substantially all the aforementioned compounds, efficiently and economically, by utilizing a minimum number of processing steps and reduced overall heat-loads on the operating plant. Other objects and advantages will be apparent from the following more detailed disclosure.

The accompanying drawing illustrates, diagrammatically, one form of the apparatus employed and capable of carrying out one embodiment of the process of this invention. While the invention will be described in detail by reference to one embodiment of the process employing the apparatus illustrated in the drawing, it should be noted that it is not intended that the invention be limited to the embodiment as illustrated, but is capable of other embodiments which may extend beyond the scope of the apparatus illustrated in the drawing. Pumps, compressors, valves and other mechanical elements necessary to effect the transfer of liquids and vapors, and to maintain the conditions of temperature and pressure necessary to carry out the function of the apparatus, are omitted in order to simplify the description. It will be understood, however, that much equipment of this nature is necessary and will be supplied by those skilled in the art.

Referring to the drawing, the product of the reaction of oxides of carbon and hydrogen in the presence of a catalyst at elevated temperatures, is supplied through line 11. This product is in the gaseous state, substantially as it comes from the reactor, at temperatures varying between approximately 300° F. to 700° F. and contains oxygenated organic compounds, comprising essentially organic acids, alcohols, esters, aldehydes, ketones and hydrocarbons and following catalyst removal, is first cooled to effect substantial condensation of normally liquid components. Conveniently, condensation may be effected in one or more cooling stages, which are represented diagrammatically in the drawing by heat-exchanger 12 with which line 11 connects. In heat-exchanger 12, gases introduced through line 11 are cooled to a temperature in the neighborhood of 200° F. to 250° F. The particular temperature selected is one which is just above the dew point of the water present in these gases. At this temperature, a small amount of oil is condensed together with condensed gases containing the aforementioned oxygenated organic compounds. From heat-exchanger 12, the mixture of condensate and hot gases containing oxygenated organic compounds and hydrocarbons is transferred through line 13 to a gas separator 14. In the latter, hot gases having a temperature in the neighborhood of 200° F. to 250° F. are withdrawn through line 15, and the condensed oil separates as a lower phase which is withdrawn through line 16 and transferred to a cooler 17. From cooler 17 the oil is withdrawn through line 18. The condensed oil, withdrawn through line 16 from separator 14, may contain some of the organic acids present as partial components of oxygenated organic compounds and hydrocarbons present in the reactor gases entering heat-exchanger 12 through line 11. In order to neutralize organic acids thus present, the condensed oil is next treated with alkali. Conveniently, the condensed oil from cooler 17 is transferred through line 18 to a caustic treater 19, in which it is intimately mixed with alkali in a suitable amount introduced through line 20. After the components of the mixture are maintained in intimate contact for a time sufficient to effect the desired reactions, the mixture is withdrawn from treater 19 through line 21. To facilitate separation of excess alkali and the various reaction products from the oil, the mixture is next transferred through line 21 to a settler 22. In settler 22, separation is effected between an upper hydrocarbon or oil phase containing acid-free condensed oil and a lower aqueous phase containing water, unreacted alkali, salts of heavy organic acids, saponified esters and aldehyde polymers. The upper hydrocarbon or oil phase from settler 22, comprising substantially $C_4$ and higher boiling hydrocarbons, is withdrawn through line 23 for further processing outside the scope of the present process. The lower aqueous phase is withdrawn through line 24 for further use or treatment also outside the scope of the present process.

As described above, the hot gases from separator 14, having a temperature in the neighborhood of 200° F. to 250° F., contain oxygenated organic compounds and hydrocarbons. These gases are transferred through line 15 to a low point in a suitable scrubbing vessel 25. In this gas scrubber, the gases are subjected to intimate countercurrent contact with an organic solvent treating agent introduced through line 26, in order to absorb substantially all oxygenated organic compounds in the solvent. The solvent selected is one having a low solubility for water and in which oxygenated organic compounds present in the aforementioned reactor gases, are substantially soluble. The solvent should also have a low vapor pressure at the scrubbing temperature at which scrubber 25 is operated, namely, in the neighborhood of 200° F. to 250° F. so that the losses of solvent by evaporation may not be excessive. I have found n-hexanol, which boils at 315° F., to be overall generally suitable as a treating agent in the process described above. However, it is possible to use other higher or lower boiling organic solvents, either individually or in mixtures, provided such solvent satisfies the aforementioned requirements. For example, alcohols or mixtures of alcohols lower boiling than hexanol, may be employed such as n-pentanol which boils at 280.4° F. It is also possible to use alcohols or mixtures of alcohols higher boiling than hexanol, such as n-heptanol or n-octanol which boil at 348.8° F. and 383° F., respectively. In addition, it is possible to employ other classes of organic compounds as solvents in this process, which satisfy the aforementioned requirements. For example, ketones, such as methyl amyl ketone, or methyl hexyl ketone may be successfully employed which boil above 250° F. It is also possible to use certain aldehydes as solvents boiling above the aforementioned temperature range of 200° F. to 250° F., such as heptaldehyde or caprylaldehyde. The choice of a suitable solvent which meets the aforementioned requirements, will determine the boiling ranges of the resulting groups of extracted anhydrous oxygenated organic compounds, which are ultimately recovered in accordance with the process hereinafter described.

Overheads from scrubber 25, comprising residual hot reactor gases containing hydrocarbons and saturated with the solvent treating agent, are withdrawn through line 27 for further treatment in the process hereinafter described. The extract obtained from scrubber 25, comprising a mixture of oxygenated organic compounds and relatively large quantities of solvent, is withdrawn as bottoms through line 28. This extract is next transferred through line 28 to a fractionation tower 29. Tower 29 is operated under conditions of temperature and pressure effective to distill overhead oxygenated organic compounds lower boiling than the selected solvent treating agent, introduced into tower 25 through line 26. Where hexanol is used as the solvent, as illustrated in the drawing, this tower is operated under conditions of temperature and pressure effective to separate those oxygenated organic compounds boiling below 315° F. The overheads from tower 29, comprising a mixture of oxygenated organic compounds boiling below the boiling point of the solvent, are withdrawn through line 30. These overheads are transferred as vapors through line 30 to a condenser 31. Condenser 31 is provided to liquefy the vaporized mixture transferred from tower 29 through line 30. The mixture of oxygenated organic compounds thus condensed, is transferred from condenser 31, through line 32, to a reflux drum 33. From drum 33 the mixture of anhydrous oxygenated organic compounds, boiling below the boiling point of the solvent treating agent, is withdrawn through line 34 for further use or treatment outside the scope of the present process. A portion of the aforementioned mixture is also transferred from line 34, via line 35 with which line 34 connects, into tower 29 as reflux.

The lower fraction in tower 29 and condensed stripping vapor, comprising the solvent treating agent and a mixture of oxygenated organic compounds boiling above the boiling point of the solvent treating agent, is transferred through line 36 into a reboiler 37, at a point below the introduction of the feed into tower 29 through line 28. Reboiler 37 is supplied to effect substantial vaporization of the aforementioned lower fraction, the degree of vaporization depending upon the combination of operation conditions of temperature and pressure and constituency of the fraction in tower 29 which is transferred into the reboiler. The fraction thus partially vaporized, is returned to tower 29 from reboiler 37 via line 38. The vaporized portion of the fraction returned to tower 29, through line 38, passes upward as stripping vapor to remove oxygenated organic compounds boiling below the boiling point of the solvent treating agent.

Bottoms from tower 29 following the aforementioned stripping action, comprising a mixture of the solvent treating agent and oxygenated organic compounds boiling above the boiling point of the solvent, are withdrawn through line 39. This mixture is next transferred through line 39 to a fractionation tower 40. Tower 40 is operated under conditions of temperature and pressure, effective to distill overhead the solvent treating agent, which is withdrawn through line 41. These overheads are transferred as vapors through line 41 to a condenser 42. Condenser 42 is provided to liquefy the vaporized solvent transferred from tower 40 through line 41. Solvent, thus condensed, is transferred from condenser 42, through line 43, to a reflux drum 44. From drum 44, anhydrous solvent may be withdrawn through line 45 for further use outside the scope of the present process. A portion of the solvent thus withdrawn, is also transferred from line 45, via line 46 with which line 45 connects, into tower 40 as reflux.

The lower fraction in tower 40 and condensed stripping vapor, comprising a mixture of oxygenated organic compounds boiling above the boiling point of the aforementioned solvent treating agent, is transferred through line 47 into a reboiler 48, at a point below the introduction of the feed into tower 40 through line 39. Reboiler 48 is supplied to effect substantial vaporization of the aforementioned lower fraction, the degree of vaporization depending upon the combination of operating conditions of temperature and pressure and constituency of the fraction in tower 40 which is transferred into the reboiler. The fraction thus partially vaporized, is returned to tower 40 from reboiler 48 via line 49. The vaporized portion of the fraction returned to tower 40 through line 49, passes upward as stripping vapor to remove the solvent treating agent from the oxygenated organic compounds boiling above the boiling point of the solvent treating agent. Bottoms from tower 40, following the aforementioned stripping action, comprising a mixture of anhydrous oxygenated organic compounds boiling above the boiling point of the solvent treating agent, are withdrawn through line 50 for further use or treatment outside the scope of the present process.

As described above, overheads from scrubber 25, comprising hot reactor gases containing hydrocarbons and saturated with the solvent treating agent, are withdrawn through line 27. These gases having a temperature in the neighborhood of 200° F. to 250° F. may contain traces of organic acids. Preferably, these gases are next treated with alkali to neutralize any traces of organic acids present that were not removed by the solvent treating agent, which was introduced into scrubber 25 through line 26. For this purpose, aqueous alkali in an amount sufficient to effect the desired reaction, is injected into line 27 through line 51, with which line 27 connects. The neutralized mixture is next transferred through line 27 to a condenser 52. Condenser 52 is provided to liquefy vaporized hydrocarbons present in the gases transferred from scrubber 25 through line 27. The aqueous mixture of liquefied hydrocarbons and non-condensed gases thus obtained at a temperature of about 150° F., and containing relatively small quantities of solvent, is next transferred through line 53 to a gas separator 54. In the latter, the mixture thus introduced through line 53 at a temperature of about 150° F., will separate into an upper oil phase comprising hydrocarbons and relatively large quantities of the solvent treating agent, and a lower aqueous phase comprising unreacted alkali, salts of organic acids and relatively small quantities of solvent treating agent. The upper oil phase from separator 54 is withdrawn through line 55, while the lower aqueous phase is withdrawn through line 56. The phases thus withdrawn from separator 54, are separately subjected to further treatment in the process hereinafter described.

In addition to the oil and water layers separated in separator 54, uncondensed gases may be present which contain relatively small quantities of the solvent treating agent. A portion of these gases may be withdrawn through line 57 and recycled directly, where so desired, to a reaction zone, not shown in the drawing, wherein the catalytic hydrogenation of oxides of carbon at elevated temperatures is effected. However, the presence of relatively small quantities of the treating agent in the recycle gas may be undesirable in that there may be a subsequent loss of the treating agent if this gas is subjected to further processing outside the scope of the present process. Accordingly, this gas may be next scrubbed with a heavy absorption oil, having a low vapor pressure at the scrubbing temperature and in which the solvent treating agent present in the gas, is substantially soluble. Such oil may be a hydrocarbon or mixture of hydrocarbons having five or more carbon atoms per molecule. Conveniently, this is accomplished by transferring the aforementioned recycle gas through line 57 to a low point in a suitable scrubbing vessel 58. In this oil scrubber, the recycle gases are intimately contacted with the aforementioned heavy absorption oil, which is introduced into scrubber 58 at an upper point through line 59 in an amount sufficient to absorb in the oil, traces of solvent treating agent present in the aforementioned recycle gases. The remaining gas, essentially free of the solvent treating agent, is withdrawn from scrubber 58 through line 60, and can be next recycled for further use in the aforementioned reaction zone, not shown in the drawing and outside the scope of the present process. Bottoms from scrubber 58, comprising a mixture of heavy absorption oil and solvent, are withdrawn through line 61 for further use or treatment outside the scope of the present process.

As described above, the upper oil phase from separator 54, withdrawn through line 55 at a temperature of about 150° F., comprises a mixture of liquid hydrocarbons and relatively large quantities of the solvent treating agent. This mixture is next transferred through line 55 to a condenser 62. A portion of the uncondensed gases from separator 54 is also transferred through line 67 to condenser 62. Condenser 62 is provided to liquefy vaporized hydrocarbons present in the aforementioned mixture of gases and liquid hydrocarbons. The aqueous mixture of liquefied hydrocarbons and non-condensed gases thus obtained and containing relatively large quantities of the solvent treating agent, said mixture having a temperature of about 100° F., is next transferred through line 63 to a gas separator 64. In the latter, the mixture thus introduced through line 63, will separate into an upper oil phase, comprising substantially $C_4$ and higher boiling hydrocarbons and relatively large quantities of the solvent treating agent, and a lower aqueous phase containing relatively small quantities of the solvent treating agent. The upper oil phase from separator 64 is withdrawn through line 65 for further treatment in the process hereinafter described. Uncondensed gases in separator 64, comprising substantially $C_4$ and lower boiling hydrocarbons, are withdrawn through line 66 and may be transferred to a conventional oil recovery system, not shown in the drawing, for further use or treatment outside the scope of the present process. It should be noted that where so desired, it is possible to combine the aforementioned recycle gas withdrawn from separator 54 through line 57, with the aforementioned upper oil phase withdrawn from separator 54 through line 55 and the aforementioned gas phase withdrawn through line 67. Conveniently, this may be accomplished by transferring all the gases from separator 54 through line 57 into line 55 via line 67. The mixture thus obtained, may then be transferred via line 55, into condenser 62 for further treatment in the process previously described.

As described above, the lower aqueous phase in separator 64 contains relatively small quantities of the solvent treating agent. This phase is withdrawn as bottoms through line 68. The stream in line 68 is next combined with the lower aqueous phase in separator 54 withdrawn, as previously described, through line 56, with which line 68 connects. The combined stream in line 68 comprises an aqueous mixture of solvent treating agent, unreacted alkali and salts of organic acids. In order to strip out dissolved quantities of the solvent treating agent present therein, the aforementioned mixture is next transferred through line 68 to an upper point in a steam stripper 69. In stripper 69, the mixture introduced through line 68 is contacted with steam introduced at a low point through line 70. The rising vapor thus obtained, effects the stripping of the solvent treating agent from dissolved chemicals present in the aqueous mixture. The hot vapors, comprising a mixture of solvent treating agent and stripping steam, pass upward in stripper 69 and are withdrawn through line 71. Bottoms from stripper 69, comprising chiefly water containing relatively small quantities of unreacted alkali and salts of organic acids, are withdrawn through line 72 for further use or treatment outside the scope of the present process.

The mixture of solvent treating agent and stripping steam in stripper 69, is transferred through line 71 to a condenser 73. Condenser 73 is provided to liquefy the vaporized mixture introduced through line 71. The mixture of solvent treating agent and water thus condensed, is transferred through line 74 into a reflux drum 75. In drum 75, the mixture thus introduced through line 74 will separate into an upper layer comprising the solvent treating agent which is withdrawn through line 76, and a lower water layer which is withdrawn through line 77. The lower water layer from drum 73 is transferred, through line 77, into stripper 69 as reflux. The upper layer from drum 73, comprising the solvent treating agent, is transferred via line 76 into line 26 with which line 76 connects, for further use of the solvent treating agent in scrubber 25, in the process hereinbefore described.

As previously described, the upper oil phase from separator 64, comprising substantially a mixture of C₄ and higher boiling hydrocarbons and relatively large quantities of the solvent treating agent, is withdrawn through line 65. This mixture is next transferred through line 65 to a low point in an extraction tower 78. In tower 78 the mixture introduced through line 65, is subjected to intimate countercurrent contact with an anhydrous light alcohol as a treating agent, such as methanol or ethanol, which is introduced at an upper point in tower 78 through line 79. The light alcohol treating agent, such as methanol, as shown in the drawing, and the oil are contacted in tower 78 under conditions effective to absorb in the methanol, substantially all of the aforementioned solvent treating agent, such as hexanol, as shown in the drawing, which is present in the oil. The extract thus produced is withdrawn from the bottom of tower 78 through line 80. The oil treated in tower 78, comprising a mixture of C₄ and higher boiling hydrocarbons, passes overhead through line 81. This oil absorbs in tower 78, a small amount of the methanol or other light alcohol treating agent, and is next transferred through line 81 as the overhead raffinate to a low point in an extraction tower 82. Inasmuch as anhydrous light alcohols exhibit high solubilities for hydrocarbons as well as for oxygenated compounds, dilution of such alcohols will effect an improvement in the selectivity of extraction, so that absorption of hydrocarbons in the light alcohol treating agent is substantially prevented. To obtain such dilution, water is introduced into tower 82 at an upper point through line 83. The use of water in the manner described, is effective not only for the purpose of alcohol dilution, but also accomplishes the result of washing hydrocarbons free of the added light alcohol treating agent. Accordingly, the mixture introduced through line 81, and water introduced through line 83, are contacted in tower 82 under conditions effective to absorb in the water substantially all of the methanol or other light alcohol treating agent contained in the oil stream passing through line 81. The overhead raffinate thus produced, comprising C₄ and higher hydrocarbons, is withdrawn through line 84 for further use or treatment outside the scope of the present process.

The extract from tower 82, comprising aqueous methanol or other light alcohol treating agent, is withdrawn as bottom through line 85. The extract thus obtained, is next transferred through line 85 to a fractionation tower 86. In tower 86 the extract is heated under proper operating conditions of temperature and pressure effective to distill overhead the light alcohol treating agent, namely, methanol, as shown in the drawing. These overheads are transferred as vapors through lie 87 to a condenser 88. Condenser 88 is provided to liquefy vaporized methanol transferred from tower 86 through line 87. Methanol thus condensed, is transferred from condenser 88 through line 89 to a reflux drum 90. From drum 90, anhydrous methanol is withdrawn through line 91 and recycled to tower 78 for further use as the light alcohol treating agent, via line 79 with which line 91 connects. A portion of the aforementioned methanol is also transferred via line 92 with which line 91 connects, into tower 86 as reflux.

The lower aqueous fraction in tower 86 and condensed stripping vapor, comprising chiefly water containing small quantities of methanol, is transferred through line 93 into a reboiler 94, at a point below the introduction of the feed into tower 86 through line 85. Reboiler 94 is supplied to effect substantial vaporization of the aforementioned low fraction, the degree of vaporization depending upon the combination of operating conditions of temperature and pressure and constituency of the fraction in tower 86 which is transferred into the reboiler. The fraction thus partially vaporized, is returned to tower 86 from reboiler 94 via line 95. The vaporized portion of the fraction returned to tower 86 through line 95, passes upward as stripping vapor to separate methanol from water. Water remaining in tower 86, following the aforementioned stripping action, is transferred as bottoms through line 83 into tower 82 for further use in the process hereinbefore described. Make-up water is introduced into tower 82 through line 96, with which line 83 connects.

As previously described, bottoms from tower 78, comprising a mixture of both solvent treating agent such as methanol and hexanol, as shown in the drawing, are withdrawn through line 80. This mixture is next transferred through line 80 to a fractionation tower 97. In tower 97, the mixture is heated under proper operating conditions of temperature and pressure effective to distill overhead the light alcohol treating agent, namely, methanol, as shown in the drawing, which is withdrawn through line 98. These overheads are transferred as vapors through line 98 to a condenser 99. Condenser 99 is provided to liquefy vaporized methanol transferred from tower 97 through line 98. Methanol thus condensed, is transferred from condenser 99 through line 100 to a reflux drum 101. From drum 101 anhydrous methanol is withdrawn through line 102 and recycled to tower 78 for further use as the light alcohol treating agent, via line 79 with which line 102 connects. Make-up methanol is introduced into tower 78 through line 103, with which line 79 connects. The methanol in line 102 is also transferred, via line 104 with which line 102 connects, into tower 97 as reflux.

The lower hexanol fraction in tower 97 and condenser stripping vapor is transferred through line 105 into a reboiler 106, at a point below the introduction of the feed into tower 97 through line 80. Reboiler 106 is supplied to effect substantial vaporization of the aforementioned lower hexanol fraction, the degree of vaporization depending upon the combination of operating conditions of temperature and pressure and constituency of the fraction in tower 97 which is transferred into the reboiler. The fraction thus partially vaporized, is returned to tower 97 from reboiler 106 via line 107. The vaporized portion of the fraction returned to tower 97 through line 107, passes upward as stripping vapor to separate methanol from hexanol. Bottoms from tower 97, following the aforementioned stripping action, comprising hexanol, are recycled through line 26 into scrubber 25 for further use as the solvent treating agent in this scrubber. Make-up hexanol, or other selected solvent treating agent in scrubber 25, is supplied through line 108. It should be noted that where so desired, it is possible to combine all or a portion of the hexanol withdrawn through line 45 as previously described, with the hexanol stream in line 26 for further use as the solvent treating agent in scrubber 25. Conveniently, this is accomplished by transferring the hexanol stream in line 45, via line 109, into line 26 with which line 109 connects.

As previously described, the solvent treating agent introduced into tower 78 through line 79, comprises an anhydrous light alcohol such as methanol or ethanol. While it is preferred to use methanol or ethanol as overall generally suitable treating agents in the process described, it is also possible to use a mixture of light alcohols as well as individual light alcohols as treating agents. Furthermore, other types of oxygenated organic compounds or mixtures of such compounds may be used, which are miscible with and easily separable from water, and substantially more volatile than the solvent treating agent used in scrubber 25. For example, it is possible to use as the treating agent in tower 78 such oxygenated organic compounds as ketones, e. g. acetone or methyl ethyl ketone; aldehydes, e. g. acetaldehyde; and esters, e. g. ethyl acetate or methyl acetate. In addition, these compounds may be employed individually or in combination with the aforementioned alcohols as treating agents.

Although the invention has been described with particular reference to a process for the separation of oxygenated organic compounds and hydrocarbons present in the reactor gas obtained in the catalytic hydrogenation of oxides of carbon at elevated temperatures, it is not restricted thereto. The process of this invention may be applied in the separation of similar mixtures of organic compounds, without regard to the source or composition of such mixtures. While a particular embodiment of the invention has been described for purposes of illustration, it should be understood that various modifications and adaptations thereof, which will be obvious to one skilled in the art, may be made within the spirit of the invention as set forth in the appended claims.

Having thus described my invention, what I claim and desired to secure by Letters Patent is:

1. A process for recovering the products of hydrogenation of oxides of carbon which comprises cooling said products to effect substantial condensation of normally liquid components of said products to form an oil product liquid phase and gases containing oxygenated organic compounds and hydrocarbons, separating the oil product liquid phase and gases, subjecting said gases to extraction with a solvent for oxygenated organic compounds to absorb substantially all oxygenated organic compounds contained in said gases as components of the resulting extract, subjecting said extract to fractionation to separate the oxygenated organic compounds contained therein into a first fraction comprising oxygenated organic compounds boiling below the boiling point of said solvent and a second fraction comprising said solvent and oxygenated organic compounds boiling above the boiling point of said solvent, separating said solvent from said last mentioned oxygenated organic compounds, and passing the solvent thus separated to said extraction step.

2. The process of claim 1 in which the solvent is an alcohol.

3. The process of claim 1 in which the solvent is n-hexanol.

4. The process of claim 1 in which the solvent is a ketone.

5. The process in claim 1 in which the solvent is methyl amyl ketone.

6. The process of claim 1 in which the solvent is an aldehyde.

7. The process of claim 1 in which the solvent is heptaldehyde.

8. A process for recovering the products of hydrogenation of oxides of carbon which comprises cooling said products to effect substantial condensation of normally liquid components of said products to form an oil product liquid phase and gases containing oxygenated organic compounds and hydrocarbons, separating the oil product liquid phase and gases, subjecting said gases to extraction with a solvent for oxygenated organic compounds to obtain an extract containing said oxygenated compounds and an overhead comprising residual gases containing said solvent and hydrocarbons, cooling said overhead to liquefy said hydrocarbons, separating said liquefied hydrocarbons from said solvent, passing the solvent thus separated to said extraction step, subjecting gases and solvent uncondensed in said last-mentioned cooling step to scrubbing treatment with a heavy absorption oil having at least five carbon atoms per molecule, and recovering said solvent as an extract from said scrubbing treatment.

9. The process of claim 8 in which liquefied hydrocarbons having four or more carbon atoms per molecule and said solvent are separated from uncondensed gases comprising substantially hydrocarbons having not more than four carbon atoms per molecule, the mixture of hydrocarbons and solvent thus separated is subjected to extraction with an oxygenated organic solvent substantially more volatile than said first-mentioned solvent to absorb substantially all of said first-mentioned solvent contained in said mixture as a component of the resulting extract, said extract is subjected to fractionation to separate said first-mentioned solvent from said last-mentioned solvent, the first-mentioned solvent thus separated is passed to said first-mentioned extraction step, and the last-mentioned solvent thus separated is passed to said last-mentioned extraction step.

10. The process of claim 9 in which said last-mentioned solvent is a light alcohol.

11. The process of claim 9 in which said last-mentioned solvent is methanol.

12. The process of claim 9 in which said last-mentioned solvent is a ketone.

13. The process of claim 9 in which said last-mentioned solvent is acetone.

14. The process of claim 9 in which said last-mentioned solvent is an aldehyde.

15. The process of claim 9 in which said last-mentioned solvent is acetaldehyde.

16. The process of claim 9 in which the raffinate from said last-mentioned extraction comprising hydrocarbons having four or more carbon atoms per molecule and said last-mentioned solvent is subjected to a third extraction with water to absorb substantially all of said last-mentioned solvent contained in said raffinate as a component of the resulting extract, the extract thus obtained is subjected to fractionation to separate water from said last-mentioned solvent dissolved therein, and water thus separated is passed to said third extraction step.

CHARLES C. KING.

REFERENCES CITED

The following references are of record in the file of this patent:

UNITED STATES PATENTS

| Number | Name | Date |
|---|---|---|
| 1,979,841 | Pier et al. | Nov. 6, 1934 |
| 2,116,081 | Pier et al. | May 3, 1938 |
| 2,176,396 | Fenske et al. | Oct. 17, 1939 |
| 2,274,750 | Soenksen | Mar. 3, 1942 |

FOREIGN PATENTS

| Number | Country | Date |
|---|---|---|
| 446,305 | Great Britain | Apr. 28, 1936 |